(12) United States Patent
Ivanov et al.

(10) Patent No.: US 9,441,978 B2
(45) Date of Patent: Sep. 13, 2016

(54) SYSTEM FOR OUTPUTTING A THREE-DIMENSIONAL REPRESENTATION OF A TERRAIN

(75) Inventors: Vladimir Ivanov, Munich (DE); Thomas Feldbauer, Regensburg (DE); Alexey Pryakhin, München (DE); Peter Kunath, Munich (DE); Marek Strassenburg-Kleciak, Garching (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 872 days.

(21) Appl. No.: 13/458,555

(22) Filed: Apr. 27, 2012

(65) Prior Publication Data

US 2012/0274637 A1    Nov. 1, 2012

(30) Foreign Application Priority Data

Apr. 29, 2011    (EP) .................................... 11164357

(51) Int. Cl.
| | |
|---|---|
| G06T 17/05 | (2011.01) |
| G01C 21/32 | (2006.01) |
| G01C 21/36 | (2006.01) |
| G06T 17/20 | (2006.01) |
| G06T 9/00 | (2006.01) |

(52) U.S. Cl.
CPC ........... *G01C 21/32* (2013.01); *G01C 21/3638* (2013.01); *G06T 9/001* (2013.01); *G06T 17/05* (2013.01); *G06T 17/20* (2013.01)

(58) Field of Classification Search
CPC ........ G06T 17/05; G06T 9/001; G01C 21/32
See application file for complete search history.

(56) References Cited

U.S. PATENT DOCUMENTS

| | | | |
|---|---|---|---|
| 6,525,722 B1* | 2/2003 | Deering | ......................... 345/419 |
| 2004/0140991 A1 | 7/2004 | Trotta et al. | |
| 2006/0176310 A1 | 8/2006 | Arnaud et al. | |
| 2009/0105954 A1 | 4/2009 | Van Workum et al. | |
| 2009/0195555 A1* | 8/2009 | Nystad et al. | ................ 345/620 |

(Continued)

FOREIGN PATENT DOCUMENTS

| | | |
|---|---|---|
| EP | 1 798 704 A2 | 6/2007 |
| JP | 2007041692 A | 2/2007 |

(Continued)

OTHER PUBLICATIONS

McKenna , "The inward spiral method: an improved TIN generation technique and data structure for land planning applications", DG Kenna—Proc. Auto-Carto, 1987, pp. 671-679).*

(Continued)

*Primary Examiner* — James A Thompson
*Assistant Examiner* — Tapas Mazumder
(74) *Attorney, Agent, or Firm* — Artegis Law Group, LLP

(57) ABSTRACT

A database for a navigation system has digital elevation model data defining a three-dimensional surface. The database stores, for plural tiles of a tiling, a first array including three-dimensional coordinates of vertices of plural triangulated irregular networks, TINs, for the respective tile, and a plurality of second arrays. Each second array respectively defines triangular faces of a TIN and includes a plurality of vertex indices of the vertices to define triangular faces of the respective TIN. A method of outputting a three-dimensional representation of a terrain and a method of generating the database are also described.

18 Claims, 5 Drawing Sheets

(56) References Cited

U.S. PATENT DOCUMENTS

| 2010/0014918 | A1 | 1/2010 | Halvorson |
| 2010/0194606 | A1 | 8/2010 | Otte |
| 2011/0224901 | A1 | 9/2011 | Aben et al. |
| 2011/0316854 | A1* | 12/2011 | Vandrovec .................. 345/420 |

FOREIGN PATENT DOCUMENTS

| JP | 2007108202 A | 4/2007 |
| WO | 2008053597 A1 | 5/2008 |

OTHER PUBLICATIONS

Lavenberg, Fast view-dependent level-of-detail rendering using cached geometry. In Visualization, 2002. VIS 2002. IEEE, pp. 259-265.*

Bartholdi et al., "Multiresolution Indexing of Triangulated Irregular Networks". IEEE Transactions on Visualization and Computer Graphics, vol. 10, No. 3, May/Jun. 2004.*

Arne Schilling, et al; "Integrating Terrain Surface and Street Network for 3D Routing"; Lecture Notes in Geoinformation and Cartography; 2009; p. 109-126, XP002660753.

Ulrich Lenk, et al.; "The Radial Topology Algorithm—A New Approach for Deriving 2.5D GIS Data Models"; Geoinformatica; An International Journal on Advances of Computer Science for Geographic Information Systms, Kluwer Academic Publishers, BO; vol. 10, No. 4; Jan. 13, 2007; p. 447-468; XP019465229.

* cited by examiner

SYSTEM FOR OUTPUTTING A THREE-DIMENSIONAL REPRESENTATION OF A TERRAIN

PRIORITY CLAIM

This application claims the benefit of priority from European Patent Application EP 11 164 357.3, filed Apr. 29, 2011, which is incorporated by reference.

BACKGROUND OF THE INVENTION

1. Technical Field

Examples of the invention relate to methods and devices associated with the use of height information in navigation systems. Examples of the invention relate in particular to a database for a navigation system, a method of outputting a three-dimensional representation of a terrain and a method of generating a database for a navigation system. Examples of the invention relate in particular to such devices and methods in which height information is stored in the form of triangulated irregular networks (TINs) respectively defined for tiles of a tiling.

2. Related Art

Height information for a terrain may be used in navigation systems. One exemplary field in which such height information may be used is the outputting of three-dimensional maps. Optical output devices may be used for outputting electronic maps. Since electronic maps may be displayed on screens of small and/or portable devices, they have the advantage of being versatile and compact. Three-dimensional (3D) maps, i.e. perspective representations, may be of particular value to the user owing to their high recognition quality. I.e., the recognition of an environmental region, such as a street intersection, may be facilitated when a three-dimensional map is output, as compared to a conventional two-dimensional representation.

Digital elevation model (DEM) data may be stored in the form of TINs. Good run time performance may be attained when rendering the terrain from TINs. DEM data may be organized in accordance with a tiling, with tiles of the tiling covering the area in which DEM data for the terrain is available for rendering. A tile having rectangular or trapezoidal shapes may be split up into plural triangular patches. For each one of the patches, a TIN may be defined. Thus, plural TINs may be defined for respectively each tile of the tiling.

SUMMARY

In one approach to store TINs for a tile, the data for each TIN is stored separately such that all information required to reconstruct the TIN is included in the separate data structure for the TIN. In a conventional approach, the data describing a TIN may include an array in which three-dimensional coordinates (i.e., coordinate 3-tuples) for the vertices of the respective TIN are stored, another array which includes vertex indices to specify which ones of the vertices respectively form corners of the various triangular faces of the TIN, and, possibly, yet another array defining normal vectors of the triangular faces.

FIG. 11 illustrates data 41 defining plural TINs for a tile. The data 41 includes a unique identifier for the tile. An array 42 defines coordinates of all vertices of a first TIN defined on the tile. An array 43 includes vertex indices and defines the triangular faces of the first TIN. Another array (not shown in FIG. 11) may include information on normal vectors for the first TIN. An array 44 defines coordinates of all vertices of a second TIN defined on the tile. An array 45 includes vertex indices and defines the triangular faces of the second TIN. Another array (not shown in FIG. 11) may include information on normal vectors for the second TIN.

The conventional approach as explained with reference to FIG. 41 may result in redundant information being stored. For illustration, if the first and second TIN have vertices in common, the three-dimensional coordinates of these vertices may be stored several times. I.e., the coordinate 3-tuples may be included both in array 42 and in array 44. Such redundancy is undesirable with a view to storage space requirements. Accordingly, there is a need for a database and for methods which mitigate the above-mentioned drawbacks. There is in particular a need for a database and for methods which allow plural TINs to be respectively defined for each tile of a tiling, while mitigating redundancy problems.

According to an example, a database for a navigation system is provided. The database includes digital elevation model (DEM) data defining a three-dimensional surface of a terrain. The database stores, for each tile of a plurality of tiles of a tiling, a first array and a plurality of second arrays. The first array includes three-dimensional coordinates of vertices of plural triangulated irregular networks, TINs, for the respective tile. Each second array respectively defines a TIN and includes a plurality of indices of the vertices for which vertex coordinates are stored in the first array to define triangular faces of the respective TIN.

In the database, the three-dimensional coordinates of vertices of various TINs defined for the tile may all be aggregated in one first array. Thereby, problems associated with undesired data redundancy may be mitigated. Plural second arrays may make reference to one and the same first array.

The database may store, for each tile of the plurality of tiles of a tiling, respectively only one first array which includes coordinates of vertices. For each one of the vertices, the three-dimensional coordinates are included in the first array only once, even if the vertex is a vertex of several TINs. Each second array of the plurality of second arrays may be a triangle strip. Thereby, a compact description of a TIN is provided. Storage space requirements may be reduced.

An index for at least one vertex may be included in different second arrays. Thereby, the same entries of the first array are utilized by different second arrays when the corresponding TINs have a vertex in common. The database may store, for each tile of the plurality of tiles, at least two second arrays. This allows a tile to be broken up into two triangular patches. On each one of the triangular patches, a TIN may be defined. The triangular patches may be rectangular, isosceles triangles. The combination of data from different levels of detail is thereby facilitated.

The database may store, for each tile of the plurality of tiles, at least six second arrays. This allows the terrain to be stored on two different levels of detail for a given tile size. At least one of the second arrays may correspond to a TIN which partially or fully overlaps with the TIN represented by another one of the second arrays for the same tile. At least one of the second arrays may correspond to a TIN which is fully contained in the region covered by the TIN represented by another one of the second arrays for the same tile. For each tile of the plurality of tiles, two of the six second arrays may respectively define a TIN on a triangular patch obtained by bi-secting the tile. The four other second arrays may respectively define a TIN on a triangular patch obtained by partitioning the tile into four equal-sized rectangular, isosceles triangles. The TINs defined on the smaller size triangular patches may respectively partially or fully overlap with a TIN defined on the larger size triangular patch.

Entries for vertices in the first array may be ordered in accordance with a distance metric for vertex coordinates. The sequence of entries in the first array may be selected such that for any given vertex having an entry in the first array, the successive entry of the first array includes the vertex coordinates of the one vertex which is not included in any one of the entries preceding the entry for the given vertex, and which has minimum distance from the given vertex according to the distance metric. Thereby, an order of entries may be established in which the distance between the vertex coordinates of successive entries, determined according to the distance metric, is small. The distance metric may be an $L_p$ metric or any other suitable distance metric.

When the entries in the first array are ordered in accordance with a distance metric, a delta encoding may be used for the vertex coordinates stored in the first array. Vertex coordinates in an absolute frame of reference or relative to a characteristic point on the tile may be stored for the first entry of the first array. For each following entry, the difference in coordinates (i.e., the distance vector) between the vertex coordinates of the vertex which is assigned to this entry and the vertex coordinates of the vertex assigned to the directly preceding entry may be stored in the first array. With the entries being ordered in accordance with a distance metric, the most significant bits of the entries which are zeroes may be omitted. Thereby, storage space requirements may be further reduced.

For some or all tiles of the tiling, the database may store more than one first array which includes three-dimensional coordinates of vertices of plural TINs for the respective tile. In this case, at least one of the first arrays is referenced by different second arrays of the respective tile.

According to another example, a navigation system is provided. The navigation system includes the database of any one example or example, an optical output device, and a processing device. The processing device is coupled to the database and to the optical output device. The processing device may be configured to control the optical output device to output a representation of a three-dimensional terrain based on data retrieved from the database.

The processing device may be configured to render plural triangulated irregular networks, TINs, for a tile to generate the perspective view. The processing device may be configured to determine three-dimensional coordinates of vertices of the plural TINs from one and the same first array stored in the database for the respective tile.

According to another example, a method of outputting a representation of a three-dimensional terrain is provided, in which the representation of the three-dimensional terrain is generated using a database of any one example or example. In the method, plural triangulated irregular networks, TINs, may be rendered for a tile of a tiling. Vertex coordinates for vertices of the plural TINs may be retrieved from one and the same first array stored in the database for the respective tile.

According to another example, a method of generating a database for a navigation system is provided. In the method, the following steps are respectively performed for each tile of a tiling: Vertex coordinates of vertices of plural triangulated irregular networks, TINs, defined for the respective tile are determined. A first array which includes the determined vertex coordinates for the various TINs is generated. A second array is respectively generated for each one of the plural TINs, such that each second array respectively includes a plurality of indices of the vertices for which vertex coordinates are included in the first array. The second array is generated so as to define which vertices are located at corners of the various triangular faces of the respective TIN.

In the method, the vertex coordinates of plural different TINs are aggregated in one first array. Redundancy problems may thereby be mitigated. The first array may be generated such that the three-dimensional coordinates of any vertex are included only once in the first array, even if the vertex is a vertex of plural TINs.

Each second array of the plurality of second arrays may be generated as a triangle strip. Thereby, a compact description of a TIN is provided. Storage space requirements may be reduced. The plurality of second arrays may be generated such that an index for at least one vertex is included in different second arrays. Thereby, the same entries of the first array are references by different second arrays when the corresponding TINs have the respective vertex in common.

For each tile of the plurality of tiles, at least two second arrays may be generated. For each tile of the plurality of tiles, at least six second arrays may be generated. Thereby, triangular patches configured as rectangular isosceles patches may be defined, for which respectively a TIN may be defined. Combining data from different levels of detail is thereby facilitated.

The method may include determining an order of entries for vertices in the first array in accordance with a distance metric. To this end, a procedure may be performed in which a vertex is selected to be a starting vertex, for which an entry is generated at the first position in the first array. Subsequently, the following steps are performed iteratively to add entries for vertices to the first array: For the vertex which is the last in the first array, the one of the remaining vertices which are not yet included in the first array is selected which has minimum distance from the vertex which is the last in the first array. An entry for this vertex is then added at the end of the first array. The process may continue until entries have been generated in the first array for all vertices.

A delta encoding may be used for the coordinate 3-tuples of the vertices. If entries for vertices are generated in the first array in accordance with a distance metric, a distance vector may be determined when the nearest neighbour vertex has been determined. Distance vectors between successive vertices, rather than the absolute vertex coordinates, may be stored in the first array. The database may be stored on a storage medium. The database may be deployed to a navigation system.

It is to be understood that the features mentioned above and those to be explained below can be used not only in the respective combinations indicated, but also in other combinations or in isolation.

BRIEF DESCRIPTION OF THE DRAWINGS

The foregoing and other features of examples will become more apparent from the following detailed description of examples when read in conjunction with the accompanying drawings. In the drawings, like reference numerals refer to like elements.

DETAILED DESCRIPTION OF EXAMPLES

Figure 1:
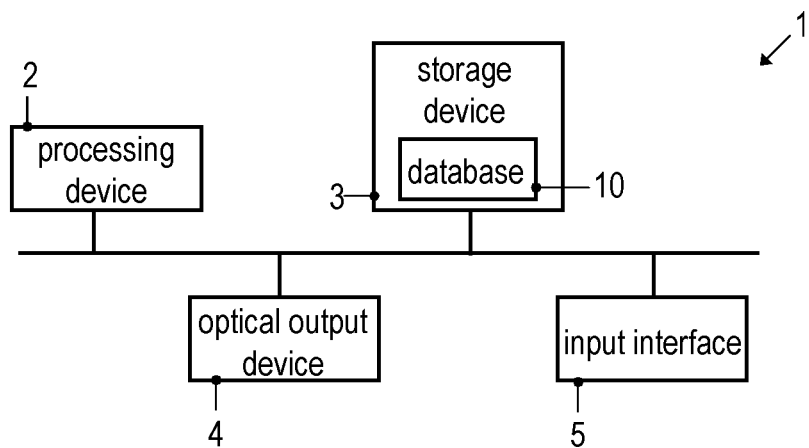
FIG. 1 is a schematic block diagram of a navigation system.

FIG. 1 schematically illustrates a navigation system 1 according to an example. The navigation system 1 comprises a processing device 2 controlling the operation of the navigation system 1. The processing device 2 may comprise a central processing unit, for example in form of one or more microprocessors, digital signal processors or application-specific integrated circuits. The processing device 2 may also include a graphics processor. The navigation system 1 further includes a database 10 stored in a storage device 3. The storage device 3 may comprise any one, or any combination, of various types of memory, such as random access memory, flash memory or a hard drive, but also removable memories such as a compact disk (CD), a DVD, a memory card or the like. The navigation system 1 also includes an optical output device 4. The navigation system 1 may include additional components, such as a position sensor and/or a wireless receiver and/or an input interface 5.

The storage device 3 stores a database 10 which defines a three-dimensional terrain. The data in the database 10 may be used by the processing device 2 to generate three-dimensional maps, i.e., to visualize the terrain, in a bird's view or in a worm's view perspective view, or similar.

As will be explained in more detail in the following, the data in the database 10 is organized in accordance with a tiling. For each tile of the tiling, the data in the database defined plural TINs. Each TIN may be defined on a triangular patch having the shape of a rectangular, isosceles triangle.

The data defining the plural TINs for a tile respectively include a first array in which the three-dimensional coordinates of all vertices of the plural TINs defined for the respective tile are contained. The first array may be a list which successively includes coordinate 3-tuples of various vertices.

The data for each tile includes plural second arrays, each defining triangular faces of one of the plural TINs for the respective tile. Each second array may be an array of vertex indices specifying which ones of the various vertices are located at the corners of the triangular faces of the TIN. Thereby, the triangular faces of the TIN are defined. The data for each tile may further include an array of normal vectors for each TIN.

Figure 2:
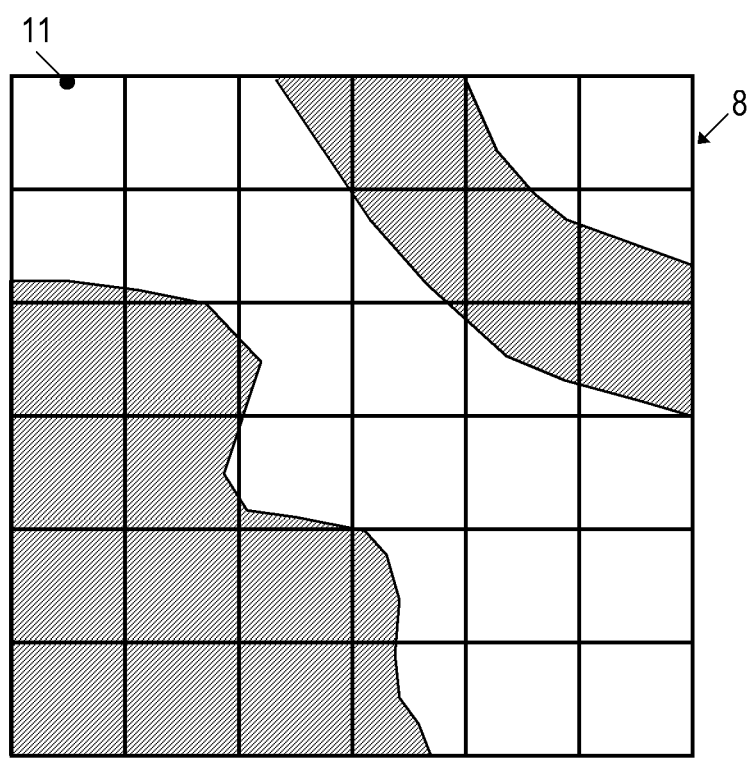
FIG. 2 illustrates a terrain with superimposed tiling.

FIG. 2 is a schematic plan view of a terrain for which a tiling 8 is defined. The terrain may extend over various elevation levels, as schematically indicated by shaded areas. Shaded areas may be at one elevation level, such as sea level, while non-shaded areas may be at other elevation levels, exhibiting gradual changes in elevation. The tiling 8 has plural tiles, such as tile 11. The tiling 8 is defined to cover the terrain. The tiles of the tiling may be essentially rectangular, in particular square or, taking into account the effects of spherical projection for large size tiles, may be slightly trapezoidal.

Figure 3:
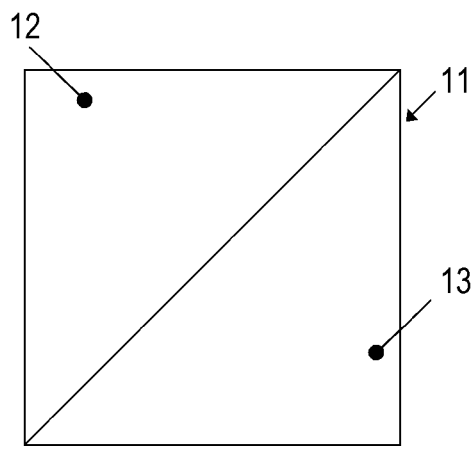
FIG. 3 is a plan view of a tile of the tiling.

The three-dimensional surface structure of the terrain may, at least to a good approximation, be represented by plural TINs defined for each tile. TINs show good performance when rendering the surface structure at run time. FIG. 3 is a plan view of a tile 11. The tile 11 is bi-sected into triangular patches 12 and 13. Each triangular patch 12, 13 is a rectangular, isosceles triangle.

Figure 4:
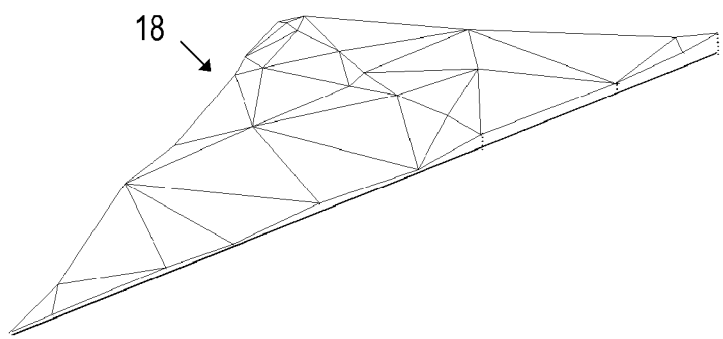
FIGS. 4 and 5 are perspective views illustrating the triangulated irregular networks (TINs) for triangular patches of a tile.
Figure 5:
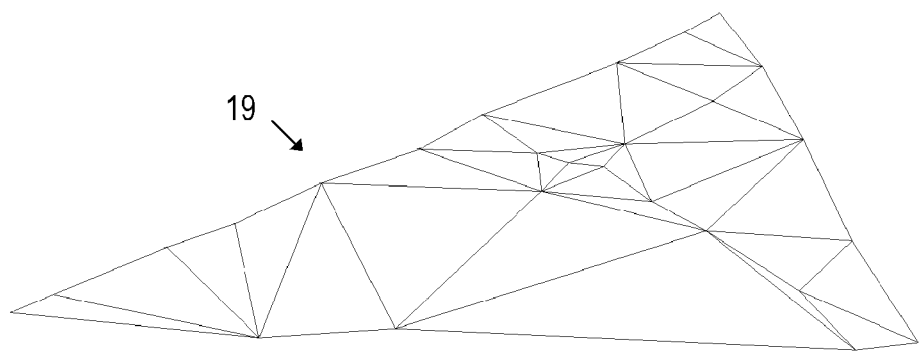

The definition of triangular patches may vary between tiles in an alternating fashion. For illustration, triangular patch 12 is located in the north-west portion and triangular patch 13 is located in the south-east portion of tile 11. Tiles which share a side with tile 11 may be bi-sected such that one triangular patch is located in the north-east portion of the tile and the other triangular patch is located in the south-west portion of the tile. On each one of the triangular patches 12, 13, a TIN may be defined. FIG. 4 illustrates a TIN 18 defined on triangular patch 12. FIG. 5 illustrates another TIN 19 defined for triangular patch 19.

The TINs 18, 19 have several vertices in common. In order to reduce data redundancy, data defining the two TINs 18 and 19 uses a global list of vertex coordinates for the tile, in which the three-dimensional coordinates of all vertices of TIN 18 and of all vertices of TIN 19 are included. Vertex coordinates of vertices which are vertices of both TIN 18 and of TIN 19 are nevertheless stored only one time in the list of vertex coordinates.

Figure 6:
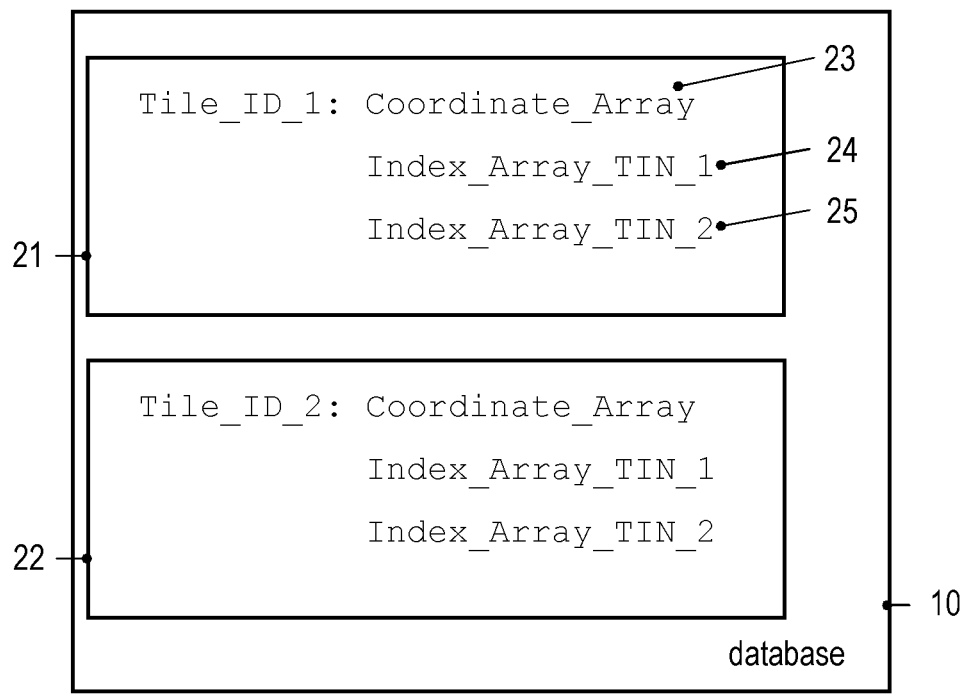
FIG. 6 is a schematic view of a database.

FIG. 6 is a schematic view of a database 10. The database 10 may be used in the navigation system 1. The database 10 defines, for each one of plural tiles, a plurality of TINs. The database 10 includes data 21 defining plural TINs for a first tile and data 22 defining plural TINs for a second tile. For a greater number of tiles, data similar to data 21 and data 22 would be stored in the database 10 for each additional tile. The data 21, 22 for different tiles may have the same basic structure. Only the structure of data 21 will exemplarily be explained in more detail. The data 21 includes a unique tile identifier and data defining plural TINs. The data 21 includes an array 23, e.g. a list, of three-dimensional vertex coordinates of all vertices included in any one of the TINs defined for the tile.

The data 21 includes a second array 24 which describes the triangular faces of one TIN. The second array 24 may be an array, e.g. a list or table, of vertex indices. The second array 24 may define which ones of the various vertices having an entry in the first array 23 form corners of triangular faces of the TIN. The second array 24 may define the triangular faces in the form of a triangle strip.

The data 21 includes another second array 25 which describes the triangular faces of another TIN. The second array 25 may also be an array, e.g. a list or table, of vertex indices. The second array 25 may define which ones of the various vertices having an entry in the first array 23 form corners of triangular faces of the other TIN. The second array 25 may define the triangular faces in the form of a triangle strip.

If more than two TINs are defined on the tile, a correspondingly greater number of second arrays which are respectively arrays of vertex indices are included in the data 21. The number of vertices included in the first array 23 may increase with increasing number of TINs. However, all second arrays refer to the same first array 23 even if more than two second arrays, e.g. six second arrays, are provided. For any vertex which is a vertex of plural TINs, the vertex coordinates are stored in the first array 23 only once, independently of the number of TINs which include the respective vertex. The second entries may respectively store the plural triangular faces of the TIN as a triangle stripe. This will be illustrated with reference to FIGS. 7 and 8.

Figure 7:
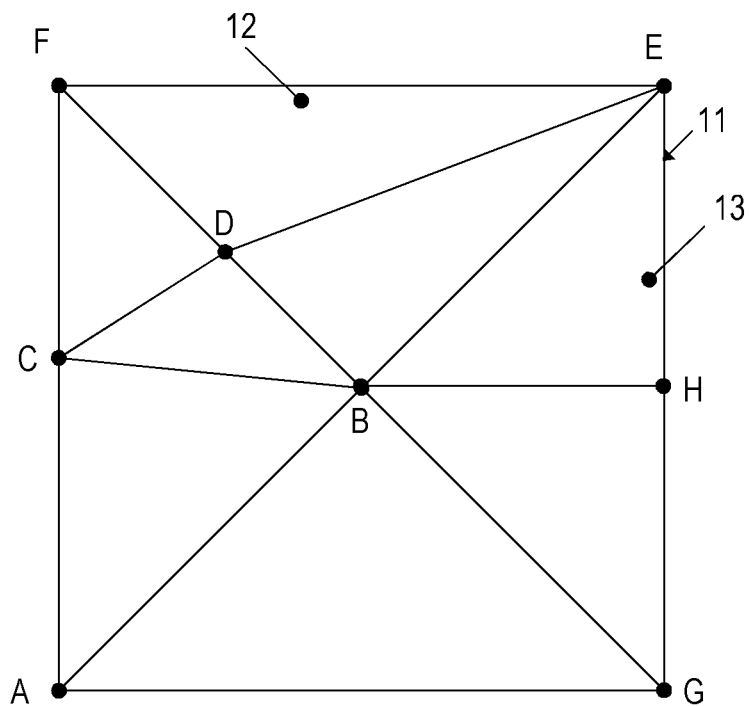
FIG. 7 is a plan view of a tile for which two TINs are defined.

FIG. 7 shows a plan view of the tile 11. The tile 11 is bi-sected into triangular patches 12, 13. One TIN is defined on patch 12. Another TIN is defined on patch 13. The two TINs have vertices A, B and E in common. I.e., vertices A, B and E are vertices of the TIN defined on patch 12 and of the TIN defined on patch 13.

Figure 8:
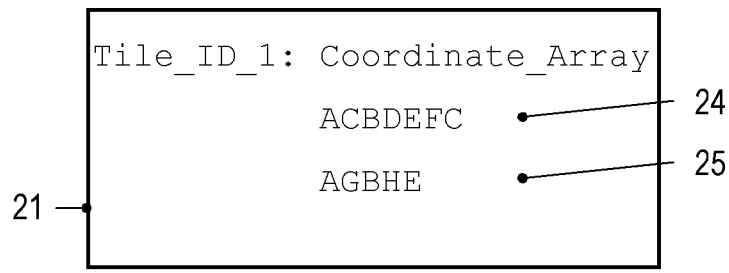
FIG. 8 is a schematic view of a data defining the two TINs of FIG. 7.

FIG. 8 is a schematic representation of the data 21 representing the digital elevation model (DEM) on the tile 11. The data 21 includes a first array in which the vertex coordinates of vertices A-H are stored. The three-dimensional coordinates of vertices A, B and E are included in the first array only one time.

The data 21 has a second array 24 describing the triangular faces of the TIN on triangular patch 12. The second array 24 is a triangle strip in which various vertices are included in a list. For illustration, the TIN on triangular patch 12 may be defined as triangle strip "ACBDEFC". At run time, this will be resolved to define the triangles ACB, CBD, BDE, DEF, and EFC. Thus, all triangular faces may be defined in a compact way by a list of vertex indices. The three-dimensional coordinates of all vertices can be retrieved from the first array. Thus, the triangular faces may be reconstructed.

The data 21 has another second array 25 describing the triangular faces of the TIN on triangular patch 13. The second array 25 is a triangle strip in which various vertices are included in a list. For illustration, the TIN on triangular patch 13 may be defined as triangle strip "AGBHE". At run time, this will be resolved to define the triangle AGB, GBH, and BHE. Thus, all triangular faces may be defined in a compact way by a list of vertex indices. The three-dimensional coordinates of all vertices can be retrieved from the first array. Thus, the triangular faces may be reconstructed.

More than two TINs may be defined for each tile. The TINs may also overlap with each other. For illustration, in addition to two TINs defined on triangular patches respectively having an area equal to half the tile size, four TINs defined on triangular patches respectively having an area equal to one quarter of the tile size may be used for each tile.

Figure 9:
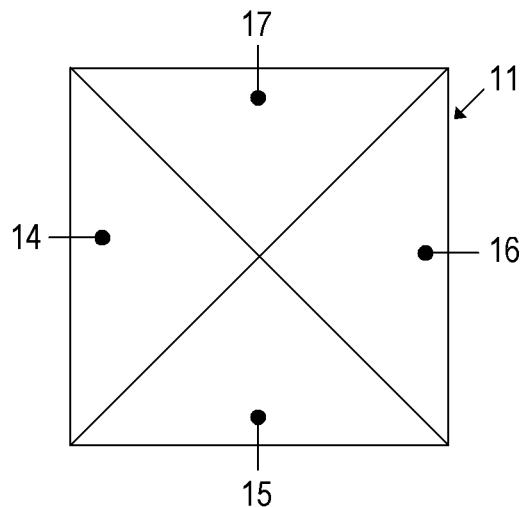
FIG. 9 is a plan view illustrating the partitioning of a tile for another level of detail.
Figure 11:
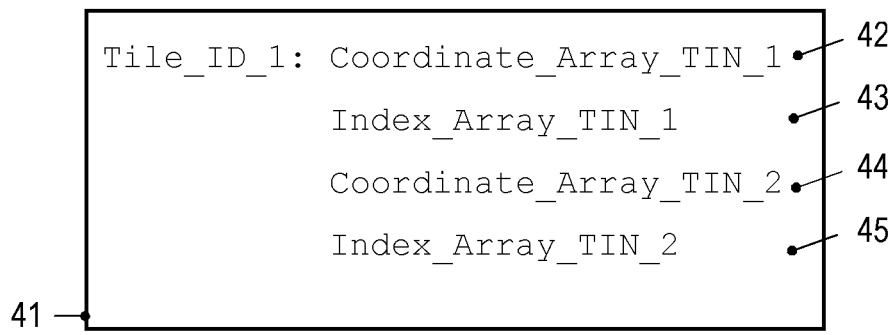
FIG. 11 is a schematic view of a conventional database.

FIG. 9 illustrates the tile 11 partitioned into four rectangular, isosceles triangular patches 14-17. Patches 14 and 17 are obtained by bi-secting patch 12. Patches 15 and 16 are obtained by bi-secting patch 13. On each one of triangular patches 14-17, another TIN may be defined. The TINs defined for the smaller triangular patches 14-17 may be used to show the terrain at a greater level of detail, for a given tile size. Different levels of detail may be combined. For illustration, a larger triangular patch 12 and the TIN defined thereon may be combined with smaller triangular patches 15, 16 and the TINs combined thereon when rendering the terrain.

When a total of six TINs are defined for a tile, an array of vertex indices may be provided for each one of the six TINs. The array may respectively be a triangle strip, as explained with reference to FIGS. 7 and 8. Each one of the arrays of vertex indices may reference vertices for which the three-dimensional coordinates are stored in one and the same first array.

When generating the database in which, for each tile, there is a global first array including vertex coordinates for plural TINs, the entries in the first array may be ordered in accordance with a distance metric. I.e., the sequence in which vertex coordinates are stored in the first array may be selected based distances between the vertices. This allows the vertex coordinates to be stored in delta encoded form.

Figure 10:
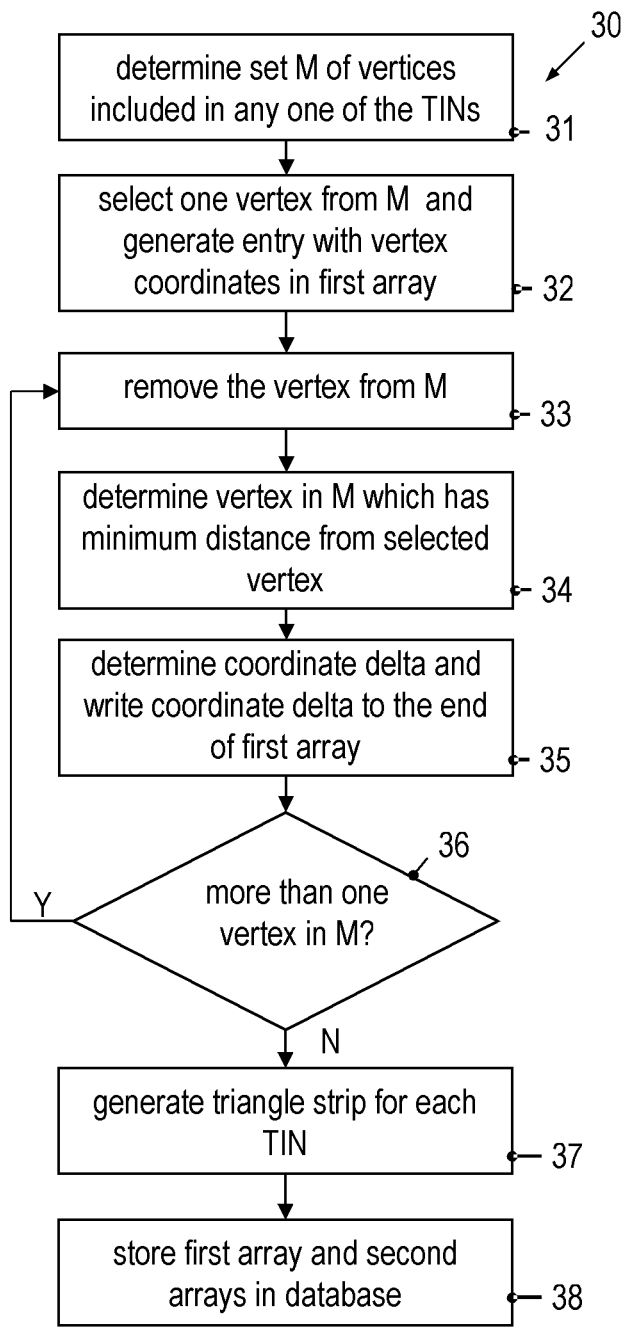
FIG. 10 is a flow chart of a method of generating a database.

FIG. 10 is a flow chart of a method 30 of generating a database for a navigation system. The method may be used to generate the database 10 of the navigation system 1. At 31, the set of all vertices of the various TINs defined for the tile is determined. The set of vertices may be the set of all vertices of two or six TINs defined for the tile. The set of all vertices is denoted as M. At 32, one of the vertices is selected. The vertex may be selected randomly or using an algorithm which determines a starting point for a delta encoded chain. An entry is generated in the first array for the selected vertex. The entry includes the vertex coordinates of the selected vertex.

Additional entries are added to the first array in an iterative manner. In the first iteration, the first array only has the entry for the vertex selected at 32. At 33, the selected vertex is removed from the set M. The set M is updated so that it only includes vertices for which no entry has been generated in the first array, yet. At 34, the vertex in M is determined which has minimum distance from the vertex for which the last entry in the first array has previously been generated. In the first iteration, the vertex which has minimum distance from the vertex selected at 32 is identified. Any suitable distance metric may be used. For illustration, an $L_p$-metric may be used.

At 35, the coordinate delta between the vertex coordinates of the vertex determined at 34 and the vertex coordinates of the vertex for which the last entry in the first array has previously been generated is determined. This coordinate delta is written into the first array as new last entry of the first array. Thereby, delta encoding of vertex coordinates may be performed. If no delta encoding is to be performed, the coordinates of the vertex selected at 34 (rather than the coordinate delta) may be written into the first array as new last entry of the first array.

At 36, it is determined whether there is more than one vertex left in M, i.e., whether entries have already been generated in the first array for all vertices of the various TINs. If there is more than one vertex left in M, the method returns to 33 and steps 33-36 are repeated. Otherwise, the method proceeds to 37. At 37, a triangle strip is generated for each TIN. The triangle strip may be generated as list of vertex indices, each vertex index uniquely identifying one of the vertices for which coordinates have been registered in the first array. At 38, the first array and the second arrays are stored in the database. The method 30 may be performed for plural tiles of a tiling. The method 30 may be performed for all tiles of a tiling. The database generated using the method 30 may be deployed to vehicle navigation systems.

While methods and a device according to examples have been described in detail, modifications may be implemented in other examples. For illustration, while a tiling of square tiles has been illustrated in some examples, other tile shapes may be used.

Examples of the invention may be used for visualizing three-dimensional terrain, without being limited thereto.

We claim:

1. A non-transitory computer readable storage medium having stored thereon a navigation device database, the navigation device database having digital elevation model data defining a three-dimensional surface of a terrain and storing, for each tile of a plurality of tiles of a tiling:
   one first array including three-dimensional coordinates of vertices of plural triangulated irregular networks, where for each vertex which is common to triangular faces of a first triangulated irregular network and triangular faces of a second triangulated irregular network that has a triangular patch size different from the first triangulated irregular network and that overlaps with the first triangulated irregular network, the second triangulated irregular network included in a region covered by the first triangulated irregular network, the three-dimensional coordinates are included in the first array only once, and
  a plurality of second arrays, each second array respectively defining triangular faces of a triangulated irregular network and including a plurality of indices of the vertices for which vertex coordinates are stored in the first array to define the triangular faces of the respective triangulated irregular network.

2. The non-transitory computer readable storage medium of claim 1, where each second array of the plurality of second arrays is a triangle strip.

3. The non-transitory computer readable storage medium of claim 1, where an index for at least one vertex is included in different second arrays.

4. The non-transitory computer readable storage medium of claim 1, where the database stores, for each tile of the plurality of tiles, at least two second arrays.

5. The non-transitory computer readable storage medium of claim 4, where the database stores, for each tile of the plurality of tiles, at least six second arrays.

6. The non-transitory computer readable storage medium of claim 1, where entries for vertices in the first array are ordered in accordance with a distance metric for vertex coordinates, where the first array includes the three-dimensional coordinates in delta-encoded form.

7. A navigation system, comprising:
  a computer readable storage medium storing a database, where the database comprises a first array including three-dimensional coordinates of vertices of plural triangulated irregular networks, wherein for each vertex which is common to triangular faces of a first triangulated irregular network and triangular faces of a second triangulated irregular network that has a triangular patch size different from the first triangulated irregular network and that overlaps with the first triangulated irregular network, the second triangulated irregular network included in a region covered by the first triangulated irregular network, the three-dimensional coordinates are included in the first array only once, and a plurality of second arrays, each second array respectively defining triangular faces of a triangulated irregular network and including a plurality of indices of the vertices for which vertex coordinates are stored in the first array to define the triangular faces of the respective triangulated irregular network,
  an optical output device, and
  a processing device coupled to the database and to the optical output device, the processing device being configured to control the optical output device to output a representation of a three-dimensional terrain based on data retrieved from the database.

8. The navigation system of claim 7, where the processing device is configured to render plural triangulated irregular networks, triangulated irregular networks, to generate the perspective view, the processing device being configured to determine three-dimensional coordinates of vertices of the plural triangulated irregular networks from the same first array of the database.

9. A method of generating a database for a navigation system, comprising the steps of:
  determining, by a processor, three-dimensional vertex coordinates of vertices of plural triangulated irregular networks defined for a tile of a plurality of tiles, the plural triangulated irregular networks comprising a first triangulated irregular network and a second triangulated irregular network that has a triangular patch size different from the first triangulated irregular network and overlaps with the first triangulated irregular network, the second triangulated irregular network included in a region covered by the first triangulated irregular network;
  generating, by the processor, one first array associated with the tile, wherein the first array includes the determined vertex coordinates, where for each vertex which is common to triangular faces of at least two different triangulated irregular networks, the three-dimensional coordinates are included in the first array only once; and
  generating, by the processor, a second array for each one of the plural triangulated irregular networks, each second array being generated to respectively include a plurality of indices of the vertices for which vertex coordinates are included in the first array to define the triangular faces of the respective triangulated irregular network.

10. The method of claim 9, where each second array of the plurality of second arrays is generated as a triangle strip.

11. The method of claim 9, where the plurality of second arrays is generated such that an index for at least one vertex is included in different second arrays.

12. The method of claim 9, where, for each tile of the plurality of tiles, at least two second arrays are generated.

13. The method of claim 9, further comprising the steps of:
  determining an order of vertices for which vertex coordinates are to be included in the first array in accordance with a distance metric, and
  delta encoding the three-dimensional vertex coordinates when generating the first array.

14. A non-transitory computer readable storage medium having stored therein instructions executable by a programmed processor for generating a database for a navigation system, the storage medium comprising instructions for:
  determining three-dimensional vertex coordinates of vertices of plural triangulated irregular networks defined for a tile of a plurality of tiles, the plural triangulated irregular networks comprising a first triangulated irregular network and a second triangulated irregular network that has a triangular patch size different from the first triangulated irregular network and overlaps with the first triangulated irregular network, the second triangulated irregular network included in a region covered by the first triangulated irregular network;
  generating one first array associated with the tile, wherein the first array includes the determined vertex coordinates, where for each vertex which is common to triangular faces of at least two different triangulated irregular networks, the three-dimensional coordinates are included in the first array only once; and
  generating a second array for each one of the plural triangulated irregular networks, each second array being generated to respectively include a plurality of indices of the vertices for which vertex coordinates are included in the first array to define the triangular faces of the respective triangulated irregular network.

15. The non-transitory computer readable storage medium of claim 14, where each second array of the plurality of second arrays is generated as a triangle strip.

16. The non-transitory computer readable storage medium of claim 14, where the plurality of second arrays is generated such that an index for at least one vertex is included in different second arrays.

17. The non-transitory computer readable storage medium of claim 14, where, for each tile of the plurality of tiles, at least two second arrays are generated.

18. The non-transitory computer readable storage medium of claim 14, further comprising the steps of:
  determining an order of vertices for which vertex coordinates are to be included in the first array in accordance with a distance metric, and
  delta encoding the three-dimensional vertex coordinates when generating the first array.

* * * * *